United States Patent
Minikel

(12) 
(10) Patent No.: US 6,654,913 B1
(45) Date of Patent: Nov. 25, 2003

(54) ALTERNATE PORT APPARATUS FOR MANUFACTURING TEST OF INTEGRATED SERIAL BUS AND METHOD THEREFOR

(75) Inventor: Harry Thomas Minikel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/251,928

(22) Filed: Feb. 17, 1999

(51) Int. Cl.$^7$ ............................................... G06F 11/00
(52) U.S. Cl. ......................................... 714/43; 370/241
(58) Field of Search ........................... 714/43; 713/300; 710/10, 9, 129, 131, 104, 316, 3; 307/117; 439/638; 370/362, 241

(56) References Cited

U.S. PATENT DOCUMENTS

| | | | | |
|---|---|---|---|---|
| 4,636,716 A | * | 1/1987 | Welzhofer | 324/73.1 |
| 4,791,358 A | * | 12/1988 | Sauerwald et al. | 324/73.1 |
| 5,648,962 A | * | 7/1997 | Pirinen | 370/336 |
| 5,774,744 A | | 6/1998 | Story et al. | 395/847 |
| 5,778,218 A | | 7/1998 | Gulick | 395/558 |
| 5,784,581 A | | 7/1998 | Hannah | 395/290 |
| 5,797,028 A | | 8/1998 | Gulick et al. | 395/800.32 |
| 5,809,070 A | | 9/1998 | Krishnan et al. | 375/222 |
| 5,923,673 A | * | 7/1999 | Henrikson | 714/43 |
| 6,052,362 A | * | 4/2000 | Somer | 370/246 |
| 6,128,743 A | * | 10/2000 | Rothenbaum | 713/300 |
| 6,157,200 A | * | 12/2000 | Okayasu | 324/753 |
| 6,389,560 B1 | * | 5/2002 | Chew | 710/315 |

OTHER PUBLICATIONS

Microsoft Press Computer Dictionary, Copyright 1997, Third Edition pp. 239 and 455.*

* cited by examiner

Primary Examiner—Robert Beausoliel
Assistant Examiner—Michael Maskulinski
(74) Attorney, Agent, or Firm—J. Bruce Schelkopf

(57) ABSTRACT

An apparatus and method for integrated serial bus testing in a data processing system are implemented. During testing of the data processing system, serial bus test signals are provided via a predetermined input/output (I/O) device port. Switching circuitry decouples I/O device control circuitry from the I/O port in response to a control signal having a first predetermined value. The switching circuitry additionally decouples the serial bus controller from the serial bus interface which fans out the serial data lines to serial peripheral devices. During operation of the data processing system, the switching circuitry couples the serial bus controller to the interface, couples the I/O device controller to the I/O device port, and decouples the serial interface from the I/O device port, in response to the control signal having a second predetermined value.

17 Claims, 4 Drawing Sheets

US 6,654,913 B1

ALTERNATE PORT APPARATUS FOR MANUFACTURING TEST OF INTEGRATED SERIAL BUS AND METHOD THEREFOR

TECHNICAL FIELD

The present invention relates in general to data processing systems, and in particular, to a manufacturing test of serial bus functionality in a data processing system.

BACKGROUND INFORMATION

During the manufacture of a data processing system, it is desirable to test the subassemblies on the "planar card," or motherboard. For example, tests may need to be performed on a chip set interfacing the central processing unit (CPU). However, testing of certain subsystems may require that different operating systems be loaded to effect testing of the subsystem.

For example, in a data processing system having an integrated Universal Serial Bus (USB) hub on the motherboard, testing of the USB subsystem may require loading of an operating system such as Windows, having the capability to support USB test programming when the remaining subsystems such as the CPU, memory and traditional I/O test programming runs under DOS. This is time consuming, and increases testing costs.

Thus, there is a need in the art for an apparatus and method to independently test subsystems on a planar card. In this way, subsystems, such as a USB subsystem could be tested concurrently with the CPU, memory, and traditional I/O, thereby speeding up the testing process with a concomitant reduction in testing cost.

SUMMARY OF THE INVENTION

The aforementioned needs are addressed by the present invention. Accordingly there is provided, in a first form, a data processing system including a serial bus interface. The bus interface is operable for coupling serial data signals to one or more peripheral serial devices. Switching circuitry is coupled to the serial bus interface, wherein the switching circuitry is operable for communicating serial data signals between the serial data interface and first and second serial data transceiving units in response to a control signal.

There is also provided, in a second form, a method for integrated serial bus testing in a data processing system. The method includes the step of switching a first serial data transceiving unit to a serial bus interface in response to a control signal having a first data value. Additionally, the method constitutes switching a second serial transceiving unit to the serial bus interface in response to the control signal having a second data value, wherein the second serial transceiving unit is adapted for coupling to the data processing system via an input/output (I/O) device port.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
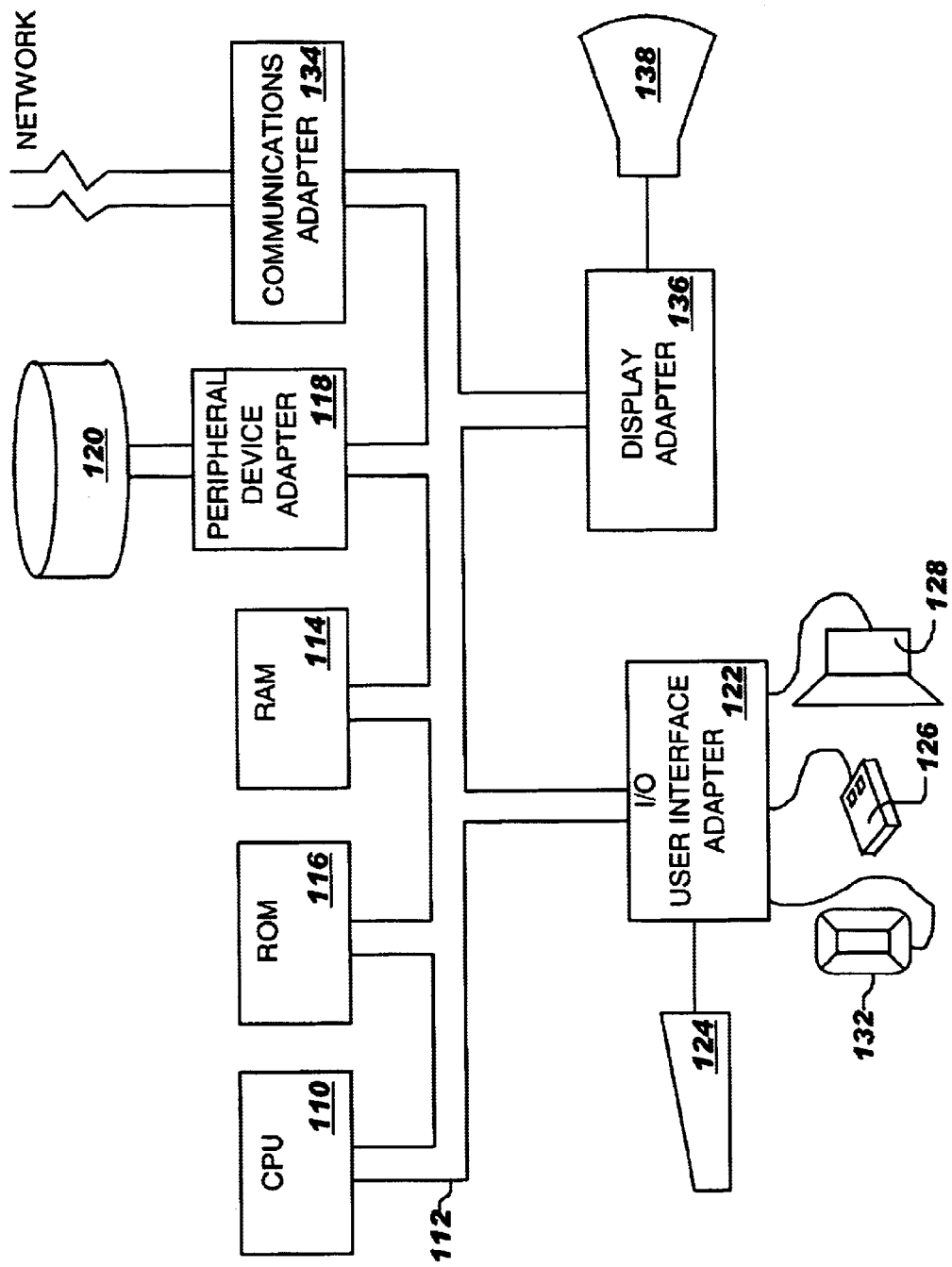
FIG. 1 illustrates, in block diagram form, a data processing system in accordance with one embodiment of the present invention.

A mechanism for the independent testing of subsystems on a data processing system planar card is provided. The subsystem to be independently tested is electrically isolated from the remaining portion of the data processing system on the planar card. Signals operable for testing the subsystem are coupled to the now isolated subsystem whereby the desired tests are performed thereon. Concurrently, the remaining portion of the data processing system may be tested by executing predetermined test software thereon. That test software need not generate test signals for the subsystem that is concurrently being tested, and consequently, need not necessarily run under the same operating system.

In the following description, numerous specific details are set forth, such as high or low logic levels, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via system bus 112. Data processing system 100 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting data processing system 100 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
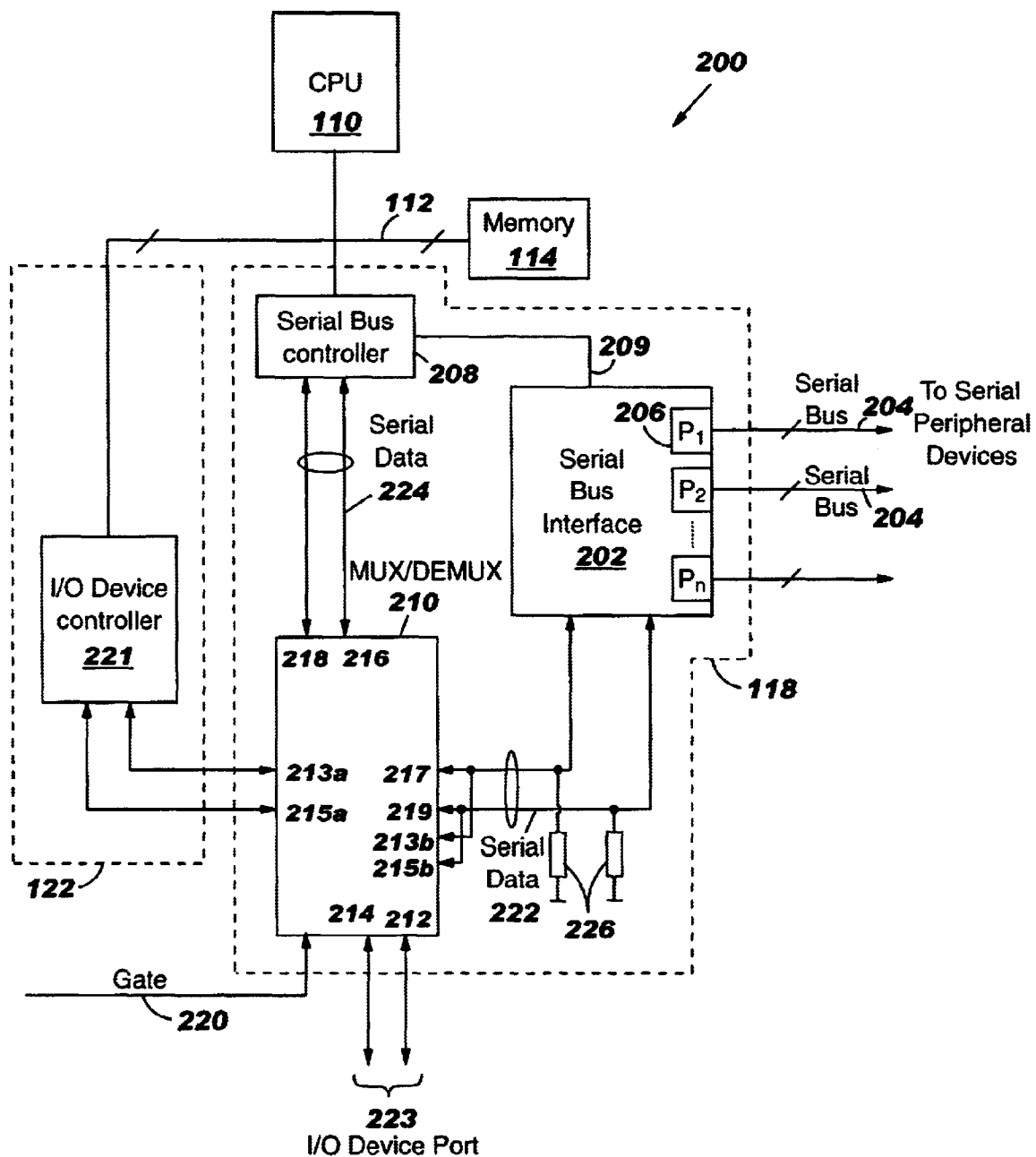
FIG. 2 illustrates, in block diagram form, a portion of the data processing system of FIG. 1.

FIG. 2 illustrates a portion 200 of data processing system 100. Serial peripheral devices, such as drive 120 in FIG. 1, are coupled to CPU 110 via peripheral device adapter 118. Peripheral device adapter 118 includes serial bus interface 202, to which each serial peripheral device is coupled by one of a plurality, n, of serial buses 204. Each serial bus 204 is driven via a corresponding port 206 of a plurality of ports, $P_1, \ldots, P_n$. Data to be communicated between CPU 110 and a serial peripheral device is transmitted on system bus 112 to serial bus controller 208 in peripheral device adapter 118. Serial bus controller 208 converts data formats between a format specified by CPU 110 and a format defined by a specification for serial bus 204. Serial buses 204 may be bidirectional, wherein serial bus controller 208, and serial bus interface 202 may incorporate serial data transceiving circuitry. Serial bus controller 208 is coupled to serial bus interface 202 via multiplexer 210. Additionally, power connection 209 may couple power sources between controller 208 and interface 202.

In an embodiment of the present invention, each serial bus may be a Universal Serial Bus (USB). In such an embodiment serial bus interface 202 may be a USB hub. In the USB architecture, hubs provide an electrical interface between USB devices and a USB host, which may include controller 208 and CPU 110. A USB hub may connect to another USB hub via one or more of serial buses 204, thereby increasing the fan-out to USB devices. Buses 204 may include differential data signals and power supplies.

Multiplexer/demultiplexer (MUX/DEMUX) 210 includes a plurality of port pairs. A first port pair includes ports 212 and 213, a second port pair includes ports 214 and 215, a third port pair includes ports 216 and 217, and the fourth port pair includes ports 218 and 219. Additionally, ports 213 and 215 constitute a pair of terminals 213*a* and 213*b*, and 215*a* and 215*b*.

Port pair members are coupled in response to a signal on gate 220. When a signal in gate 220 has a first value, port 212 is coupled to terminal 213*a*, and port 214 is coupled to terminal 215*a*. Similarly, when gate 220 has a second data value, port 212 is coupled to terminal 213*b* and port 214 is coupled to terminal 215*b* of port 215. That is, port pairs 212/213, and 214/215 function as a pair of single pole double throw (SPDT) switches with ports 212 and 214 serving as the common pole in the respective port pair. With the first data value on gate 220, port 216 is coupled to port 217 and port 218 is coupled to port 219. When gate 220 has the second data value, ports 216 and 217 are decoupled. Likewise, ports 218 and 219 are decoupled when gate 220 has the second value. In an embodiment of the present invention, multiplexer 210 may be a quad 2:1 multiplexer/demultiplexer. In such an embodiment, ports 217 and 219 may also include a pair of terminals, wherein a second one of the pair of terminals, analogous to terminals 213*b* and 215*b* in ports 213 and 215, are unconnected. Such an embodiment of the present invention may use a commercially available device, for example, a 74CBT3257 complementary metal oxide semiconductor (CMOS) MUX/DEMUX, manufactured by Texas Instruments Incorporated, Dallas, Tex.

A predetermined I/O device is coupled to a corresponding I/O device controller 221. I/O controller 221 is coupled to CPU 110 via system bus 112. In an embodiment of the present invention, the predetermined I/O device may be a mouse, such as mouse 126 in FIG. 1. The predetermined I/O device is coupled to port 212 and port 214 in multiplexer 210 via I/O port 223, and I/O device controller 221 is coupled to terminal 213*a* and 215*a* of the corresponding port 213 and 215.

Serial data communicated between serial bus controller 208 and serial bus interface 202, to effect serial communications between CPU 110 and a serial peripheral device via the corresponding one of serial buses 204, is coupled via multiplexer 210. Serial bus interface 202 is connected to ports 217 and 219 via serial data line 222. In an embodiment of the present invention in which serial buses are implemented using USB, data line 222 may include differential serial data lines. Ports 217 and 219 are coupled to corresponding ones of port pairs 216 and 218 in response to a control signal on gate 220, as described hereinabove. Ports 216 and 218 are coupled to serial bus controller 208 via serial data line 224. Additionally, ports 217 and 219 are coupled, respectively, to terminals 213*b* and 215*b* of ports 213 and 215.

Figure 3A:
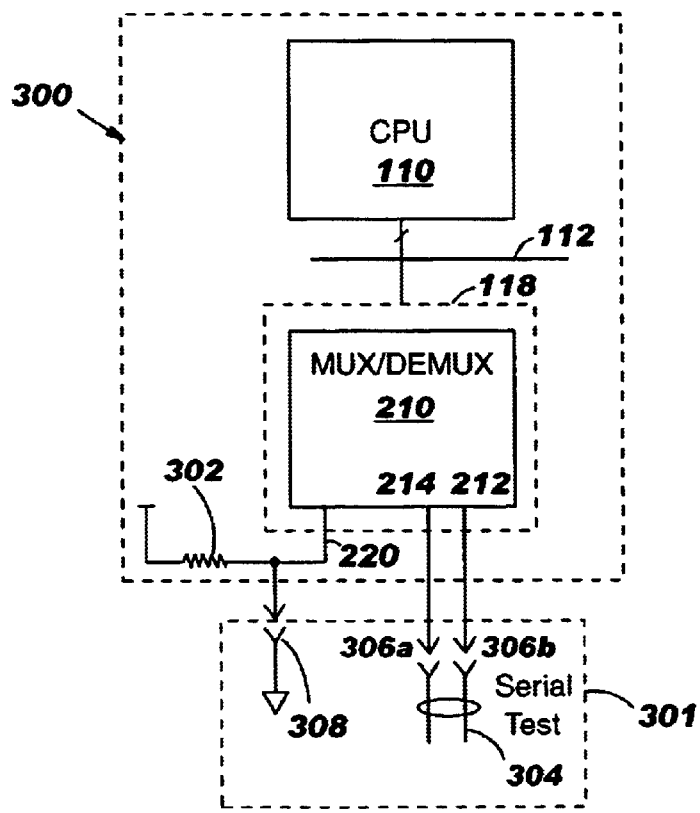
FIGS. 3A, 3B, and 3C illustrate, in block diagram form, another portion of the data processing system of FIG. 1 in accordance with alternative embodiments of the present invention.
Figure 3B:
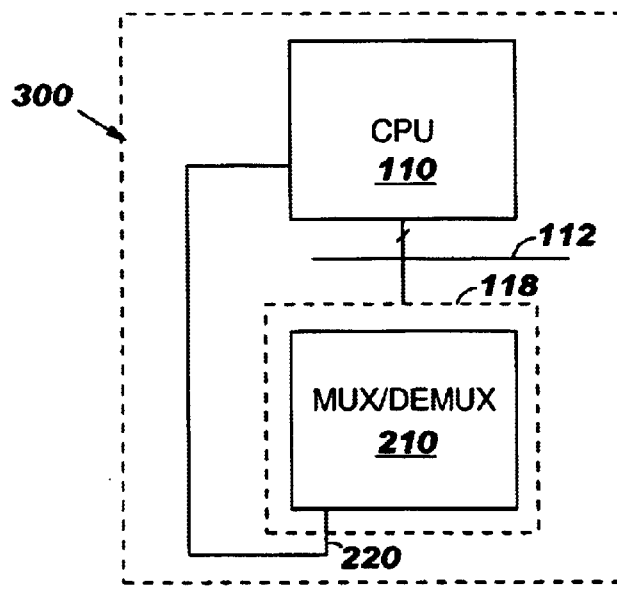

In normal operation of data processing system 100, a first control signal value is supplied to gate 220. In response thereto, as described hereinabove, port 212 is coupled to terminal 213*a* of the corresponding member of the port pair 213. Similarly, port 214 is coupled to terminal 215*a* of the corresponding port pair 215. As a consequence, the predetermined I/O device is coupled to I/O controller 221. Likewise, serial bus controller 208 is coupled to serial bus interface 202 via port pairs 216–217 and 218–219 which are coupled in response to the first control signal value on gate 220. The first signal value may be provided to gate 220 by connecting gate 220 to a first reference supply. In an embodiment of the present invention, wherein the first control signal value is supplied to gate 220 by coupling to the first reference voltage, gate 220 may be coupled to the first reference voltage through a pull-up resistor. The use of pull-up resistors would be known to an artisan of ordinary skill in the relevant art. An exemplary embodiment is illustrated in FIG. 3A, showing a portion 300 of system 100, which is discussed further below in conjunction with a description of the operation of portion 300 during testing of data processing system 100. Alternatively, gate 220 may be coupled to CPU 110 and the first signal value supplied via a control register in CPU 110. Such an embodiment is illustrated in FIG. 3B showing portion 300 of system 100.

Figure 3C:
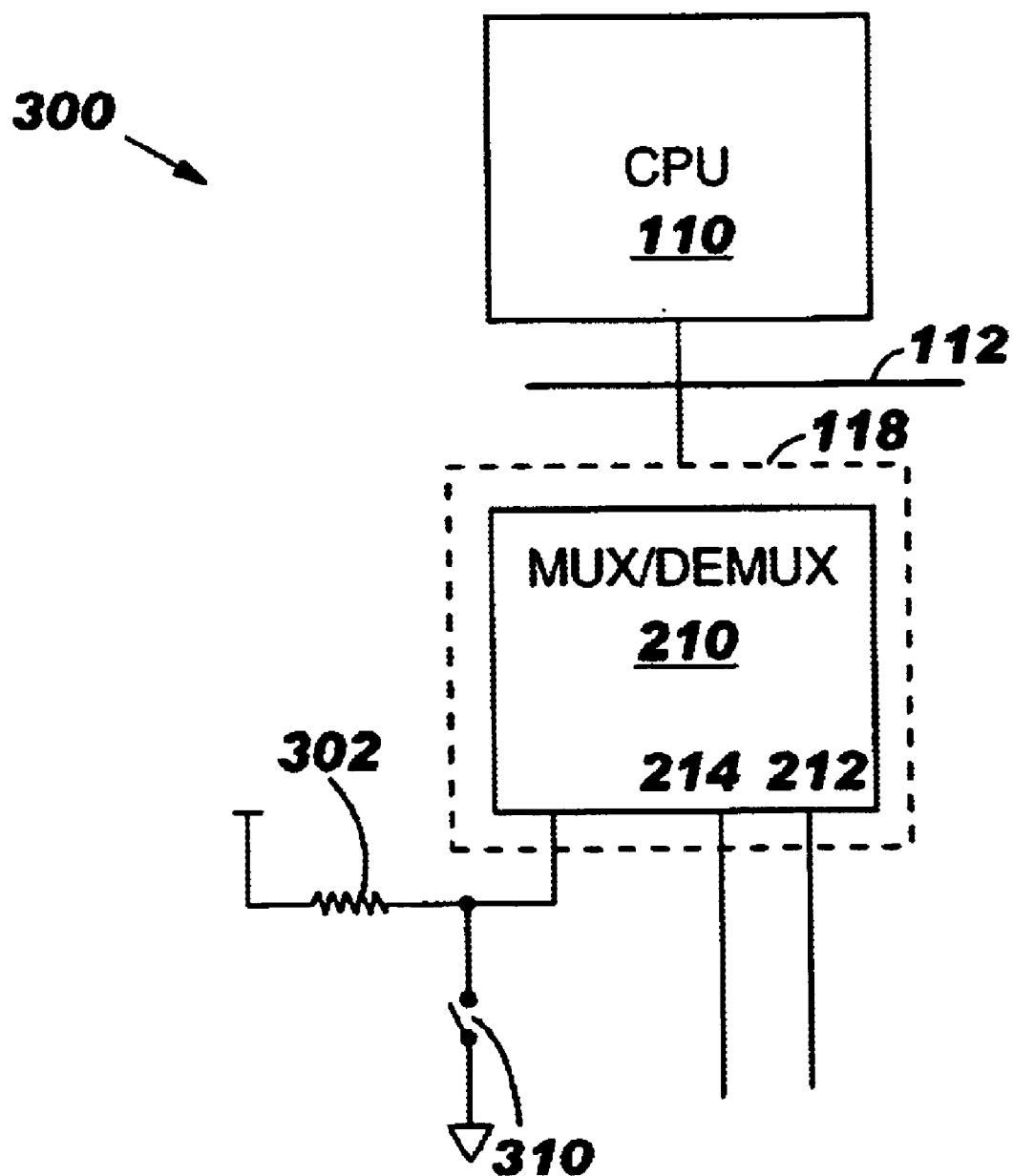

During testing of data processing system 100, a second control signal value is supplied to gate 220. In an embodiment of the present invention the second control signal value may be ground. In response, port 212 is coupled to terminal 213*b* of the corresponding port pair 213 and port 214 is coupled to terminal 215*b* of the corresponding port pair 215. Ports 217 and 219 are decoupled from the corresponding port pair 216 and 218, respectively. Consequently, serial bus controller 208 is decoupled from serial bus interface 202. Serial test signals may then be communicated through ports 212 and 214 by coupling the planar card containing system 100 to a test unit. The serial test signals may be bidirectional, wherein the test unit, which is outside the scope of the present invention, includes serial data transceiving circuitry. In an embodiment of the present invention in which a USB is used, the test unit may be a conventional personal computer, such as an IBM PC 300 series 6589-12U, manufactured by IBM, Inc., having a USB port, and running an operating system that supports USB, such as Windows98™. This is shown in FIG. 3A, illustrating an embodiment in which the second control signal value is ground. Ports 212 and 214 are coupled to serial test signal 304 via connectors 306*a* and 306*b*. Additionally, in the embodiment of FIG. 3A, gate 220 is coupled to the second control signal value, provided by portion 301 of the test unit, via connector 308. In this way, insertion of the planar board containing data processing system 100 into portion 301 of the test unit effects the switching of multiplexer 210 via gate 220. It would be understood, however, by an artisan of ordinary skill in the art that alternative mechanisms for providing control signal values to gate 220 would be within the spirit and scope of the present invention. For example, gate 220 may be controlled by a CPU 110, as illustrated in FIG. 3B in an embodiment providing serial test signals as illustrated in FIG. 3A. In another alternative shown in FIG. 3C embodiment, data processing system 100 may be configured for testing by a switch closure (310) to the second control signal value, which in the embodiment of FIG. 3C is ground.

Serial test signals on ports 212 and 214, which are coupled to terminals 213b and 215b in response to the second signal value on gate 220 are further coupled to serial bus interface 202 via the connections between serial data line 222 and terminals 213b and 215b, as shown in FIG. 2. Terminating impedances 226, which may be required, in accordance with the specification of serial data line 222, have predetermined values that account for "on" resistance values associated with multiplexer 210.

By isolating serial bus interface 202 in this way, testing of the serial data subsystem may be performed concurrently with testing of other subsystems in data processing system 100. For example, CPU 110 and associated circuitry, such as memory 114 and system bus 112, may be tested concurrently. Moreover, an operating system adapted for the testing of CPU 110 and associated components within data processing system 100 may be used, without the necessity of loading a second operating system, adapted for testing the serial data subsystem into CPU 110, in order to perform testing of the serial data subsystem.

Although the present invention and its advantages have been described in detail, it should be understood that various changes, substitutions and alterations can be made herein without departing from the spirit and scope of the invention as defined by the appended claims.

What is claimed is:

1. A data processing system comprising: a serial bus interface operable for coupling serial data signals to one or more peripheral serial devices; and switching circuitry coupled to said serial bus interface, wherein said switching circuitry is operable for communicating serial data signals between said serial data interface and first and second serial data transceiving units in response to a control signal, wherein said first serial data transceiving unit comprises a serial bus controller.

2. The data processing system of claim 1 further comprising a central processing unit (CPU) coupled to said serial bus controller, wherein said CPU is operable for communicating data via said bus controller.

3. The data processing system of claim 1 wherein said serial bus interface comprises a Universal Serial Bus (USB) hub.

4. The data processing system of claim 3 wherein said first serial data transceiving unit comprises a USB host.

5. The data processing system of claim 4 wherein said USB host comprises a central processing unit (CPU) and a USB controller.

6. The data processing system of claim 1 wherein said control signal has a first value during operation of said data processing system and a second value during testing of said data processing system.

7. The data processing system of claim 1 wherein said switch comprises a two-to-one multiplexer/demultiplexer (MUX/DEMUX) including a plurality of port pairs, each port pair having a first port and a second port wherein said second port has first and second terminals operable for coupling to said first port in response to said control signal.

8. The data processing system of claim 7 wherein said first port of a first port pair is operable for coupling to an input/output (I/O) device and said second serial data transceiving unit, said first terminal of said second port of said first port pair is coupled to an I/O control circuit, said first port of a second port pair is operable for coupling to said I/O device and said second serial data transceiving unit, said first terminal of said second port of said second port pair is coupled to said I/O control circuit, said first port of a third port pair is coupled to said first serial data transceiving unit, said first terminal of said second port of said third port pair is coupled to said serial bus interface, said first port of a fourth port pair is coupled to said first serial data transceiving unit, and said first terminal of said second port of said fourth port pair is coupled to said serial bus interface, and wherein said second terminals of said second ports of said first and second port pairs are coupled to said first terminals of said second ports of said third and fourth port pairs, respectively.

9. A method for integrated serial bus testing in a data processing system comprising the steps of:

switching a first serial data transceiving unit to a serial bus interface in response to a control signal having a first data value; and switching a second serial transceiving unit to said serial bus interface in response to said control signal having a second data value, wherein said second serial transceiving unit is adapted for coupling to said data processing system via an input/output (I/O) device port.

10. The method of claim 9 wherein said first data value is provided during operation of said data processing system and said second data value is provided during testing of said serial bus.

11. The method of claim 10 wherein said first data value is generated by coupling a control signal line for said control signal to a first reference voltage, and said second data value is generated by coupling said control signal line to a second reference voltage.

12. The method of claim 11 wherein said coupling to said second reference voltage is provided by a terminal in a test unit adapted for receiving said data processing system.

13. The method of claim 9 further comprising the step of switching a I/O device control circuitry to said I/O device port in response to said control signal having said second data value.

14. The method of claim 9 wherein said serial bus interface comprises a Universal Serial Bus (USB) hub.

15. The method of claim 9 wherein said control signal is generated in response to a data value in a control register in a central processing unit (CPU) in said data processing system.

16. The method of claim 9 further comprising the step of communicating serial bus test signals between said serial bus interface and said second serial data transceiving unit.

17. The method of claim 16 wherein said second data value is asserted during said step of communicating serial bus test signals.

* * * * *